3,260,861
STEPPING SWITCHES EMPLOYING BLOCKING MEANS SELECTIVELY DISABLING STEPPING

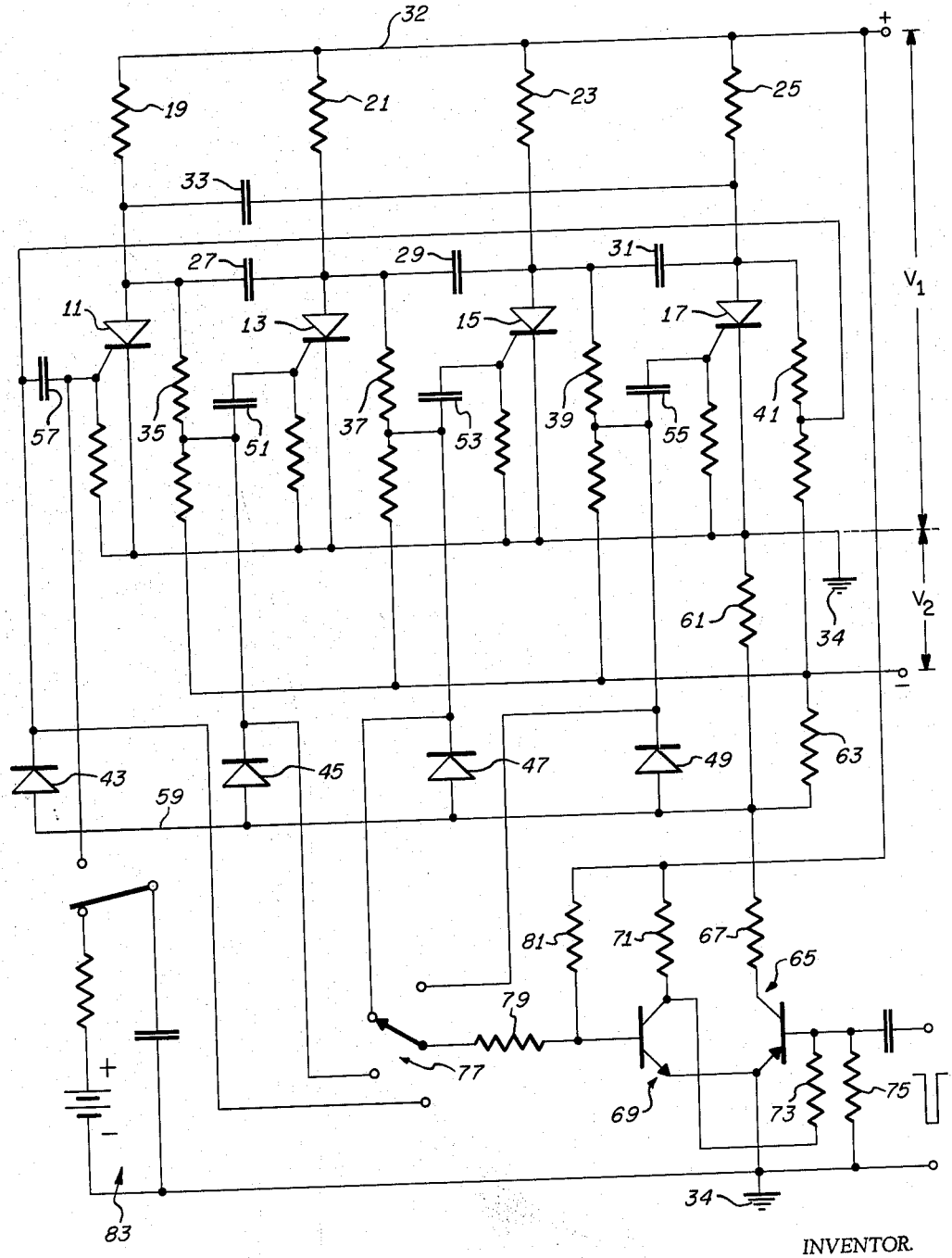

James E. Dalley, Reading, Pa., assignor to Sperry Rand Corporation, Great Neck, N.Y., a corporation of Delaware
Filed Nov. 27, 1963, Ser. No. 326,558
9 Claims. (Cl. 307—88.5)

This invention relates to stepping switches and more specifically to solid state stepping switches responsive to a predetermined number of switching pulses only.

Stepping switches are used in a variety of applications where power is to be applied to a series of individual loads in sequence.

In many of these applications, a stepping switch is required that will respond to a selected number of pulses only, and will then ignore all subsequent pulses. Predetermined pulse counters and interval timers, for instance, are known in the art. These are frequently made in the form of laboratory devices which can be set to turn equipment on or off after a selected number of trigger pulses have been applied to the counter. Such counters usually employ a combination of mechanical stepping switches in conjunction with a clutch mechanism. The selected setting is maintained even though the stepping unit itself continues to accept input pulses.

These mechanical devices, however, are necessarily bulky and slow in response. Furthermore, contact arcing in these devices can cause interference in sensitive circuits.

It is an object of the present invention to provide a fast acting stepping switch that will respond to a selected number of pulses only.

It is another object of the present invention to provide a stepping switch that is comparatively small and light in weight.

It is still another object of the present invention to provide an all-electronic stepping switch that responds to a selected number of pulses only.

These and other objects are achieved according to the principles of the present invention by providing a circuit arrangement wherein an actuated stage produces an enabling voltage that can steer the following input pulse to the next stage yet can isolate the entire device from the train of trigger pulses upon command.

The principles of the invention may be more fully understood by referring to the following detailed description and the single figure which is a circuit diagram of a stepping switch employing these principles.

A number of controlled rectifiers 11, 13, 15, and 17 are used as switching elements to switch power to their respective loads 19, 21, 23, and 25 in sequence. The controlled rectifiers are preferably solid state silicon controlled rectifiers although the equivalent gaseous thyratrons could be used if desired. The commutating capacitors 27, 29, 31, and 33 are connected between the anodes of adjacent controlled rectifiers. The loads are connected to a source of positive voltage $V_1$ through a common lead 32. The cathodes of the controlled rectifiers are returned to a common point or ground 34. Biasing voltage dividers 35, 37, 39, and 41 are connected to the anodes of the respective controlled rectifiers. These voltage dividers are returned to a source of negative voltage $V_2$ which is preferably equal and opposite to the voltage $V_1$.

The resistances of the individual resistors forming these biasing voltage dividers are made equal to each other but large in relation to the load resistors. Thus the voltage at the junction points or taps of these voltage dividers is approximately at ground level when the respective controlled rectifier is in a nonconducting state.

The diodes 43, 45, 47, and 49 serve to couple input switching pulses to the respective controlled rectifiers through the coupling capacitors 51, 53, 55, and 57. The diodes are all returned to an input signal bus 59. This bus is maintained at a negative quiescent voltage approximately one-half that of the source $V_2$ by means of a pair of equal-valued resistors 61 and 63.

It can thus be seen that the stepping switch contains a number of identical stages, each including a controlled rectifier, a biasing voltage divider connected to the anode of the controlled rectifier, a diode connected to the voltage divider and a resistance-capacitance coupling circuit connected to the gate electrode of the controlled rectifier.

The switch is advanced from one position to the next by applying a negative-going trigger pulse to the input transistor 65, which is coupled to the pulse input bus through an input load resistor 67. Thus the input transistor converts a negative-going trigger pulse into a positive-going input pulse suitable to switch the controlled rectifiers. The input transistor is preferably a PNP type connected in a grounded emitter circuit, although variations of this particular input means may be employed depending upon the nature of the available trigger pulses.

A blocking transistor 69, preferably of the NPN type is connected in a grounded emitter circuit and coupled to the positive voltage source $V_1$ through a collector resistor 71. The collector of this transistor is also connected to ground through a pair of resistors 73 and 75. The junction point of these resistors is connected to the base electrode of the input transistor. The resistors 71, 73, and 75 form an input voltage divider network, which together with the blocking transistor, determine the bias on the input transistor.

A selector switch 77 is coupled to the base of the blocking transistor through a blocking circuit voltage divider comprised of the resistors 79 and 81. The switch 77 contains a pole for each stage in the stepping switch. The poles are each connected to the cathode of one of the diodes.

The circuit is turned on by applying the supply voltages $V_1$ and $V_2$.

The silicon controlled rectifiers will all remain in the off state and the junction points of their biasing voltage dividers will be at approximately zero potential because the resistors comprising these dividers are equal in resistance, are large compared to the loads, and are connected to equal voltages of opposite polarity. All of the diodes are reverse-biased by an amount equal to one-half the voltage $V_2$. The input pulses applied to the input bus from the transistor 65 are maintained at a level considerably less than one-half $V_2$, thus no pulses reach the gate electrodes of the controlled rectifiers.

To start the switching operation, a single positive pulse from the pulse source 83 is applied to the gate electrode of the controlled rectifier 11. This pulse can be applied from a pulse source such as that illustrated. If desired, it may be applied by any convenient type of programmed source. The start pulse causes the controlled rectifier 11 to turn on and corresponds to the "home" position of the switch. The anode of this controlled rectifier drops to a potential very near ground potential, thus forcing the potential at the junction of the voltage divider 35 to a negative value approximately equal to one-half $V_2$. This constitutes an enabling voltage which removes the bias of the diode 45 and allows the next pulse from the pulse input bus 59 to pass through the diode 45 and turn on the controlled rectifier 13.

During the time that controlled rectifier 11 is on and the controlled rectifier 13 is off, the anode of the controlled rectifier 13 is at the positive potential of $V_1$. This permits the commutating capacitor 27 to charge to the potential of $V_1$. When the controlled rectifier 13 is switched on, its anode is dropped to ground potential and the anode of the controlled rectifier 11 is forced to a negative potential equal to $V_1$ until the capacitor 27 can discharge. This diverts the current away from the controlled rectifier 11 and into the commutating capacitor 27 which turns the controlled rectifier 11 off.

The anode of the controlled rectifier 13 is now at ground potential and the junction point of the voltage divider 37 is at a potential equal to one-half $V_2$. The next input pulse passes through the diode 47 and turns on the control rectifier 15. This in turn, turns off the controlled rectifier 13.

This process continues with each input pulse. Each stage is actuated in turn by the successive trigger pulses applied to the input circuit until the stage is reached which has its biasing voltage divider connected to the blocking circuit through the selector switch. When this stage is triggered into the actuated state, the voltage from the junction of the biasing voltage divider is applied to the blocking circuit. This energizes the blocking circuit so that the trigger pulses are prevented from switching the transistor 65. The stepping action is halted. Subsequent trigger pulses have no effect.

The blocking action can be understood by considering the circuit configuration. When the stage to which the selector switch is connected is not actuated, the switch side of the resistor 79 is at zero potential and the blocking transistor 69 is biased to saturation by the current through the resistor 81. Under these conditions the collector will have a positive potential of approximately one volt. This will be divided by the resistors 73 and 75 and applied to the base of the input transistor 65 as a slightly positive voltage which will keep the transistor 65 cut off.

When a negative-going trigger pulse is applied to the input terminals, it will drive the input transistor 65 into saturation and effectively place the resistor 67 in parallel with the resistor 61. This will drive the pulse input bus toward ground potential during the short time that the transistor 65 is conducting. This constitutes the positive input pulse.

When the selector switch 77 is connected to a stage which is in the actuated state, however, the switch side of the resistor 79 becomes negative, the blocking transistor 69 is biased to cut off, and a voltage divider from $V_1$ to ground is formed by the resistors 71, 73, and 75. The base of the input transistor 65 is connected to the junction of the resistors 73 and 75 so that the base of this transistor is then biased to a positive level which is greater than the magnitude of the input pulses so that these pulses cannot cause the transistor to conduct. Thus the stepping switch is disabled and the stepping action stops at the position indicated by the selector switch.

It will be appreciated that the selector switch 77 has been shown as a mechanical switch mainly for purposes of illustration. Such a switch can be readily replaced by diode switching circuits or relay circuits, for instance, if a particular application requires such a substitution.

Although only four stages have been indicated in the diagram, it is obvious that the principles of the invention can be extended to include any number of stages desired.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A stepping switch comprising a pair of stepping switch stages; means in each stage to provide an enabling voltage whenever the stage is actuated; coupling means connected between said stages, said coupling means being responsive to an enabling voltage in one of said stages to permit input pulses to pass to the other of said stages; input means connected to pass input pulses to said coupling means; blocking means to disable said input means in response to an enabling voltage; and switching means connected to couple an enabling voltage from either stage through the blocking means to the input means.

2. A stepping switch comprising a plurality of stepping switch stages; means in each stage to provide an enabling voltage whenever the stage is actuated; diode means in each stage connected to receive the enabling voltages produced in that stage, said diode means being further coupled to allow signals to pass to another stage in the presence of an enabling voltage; input means coupled to all of said diode means; and blocking means selectively coupled between said stages and said input means so as to disable said input means in response to an enabling voltage from a selected stage.

3. A stepping switch of the type employing a number of stages that are actuated serially in response to a succession of input pulses, comprising a controlled rectifier in each stage; a diode in each stage; biasing means in each stage coupled to the controlled rectifier and the diode in the same stage and operative to forward bias the diode when the controlled rectifier is in the conductive state; capacitive coupling means connected between the diode of one stage and the controlled rectifier of the following stage; input means connected to each diode and operative to couple an input signal to all of the diodes; a blocking transistor connected to the input means and operative to disable said input means whenever the blocking transistor is in a cut off condition; an input terminal on said blocking transistor; a resistor network connected to the input terminal of the blocking transistor; and a selector switch connected to couple the input terminal of said blocking transistor to any one of the diodes through the resistor network, said resistor network being proportioned to cut off the blocking transistor whenever the selector switch is connected to a forward-biased diode.

4. A stepping switch of the type employing a number of stages which can be sequentially actuated by successive input trigger pulses, comprising a controlled rectifier in each stage; individual biasing voltage dividers connected to the controlled rectifier in each stage for producing an enabling voltage whenever the controlled rectifier is conducting; individual diodes connected to the voltage divider in each stage and oriented so as to be forward biased by an enabling voltage, said diodes being further capacitively coupled to the following stage; an input transistor connected to receive trigger pulses, said input transistor being further connected to provide input pulses to all of the diodes simultaneously; a multiposition selector switch having a pole connected to each biasing voltage divider; a blocking transistor having input and output terminals; a blocking circuit voltage divider connected between the selector switch and the input terminal of the blocking transistor, said blocking circuit voltage divider being proportioned to cut off the blocking transistor when the selector switch is connected to a biasing voltage divider in an actuated stage; and a resistance network connected to the output terminal of the blocking transistor, said resistance network being further connected to the input transistor and arranged to provide increasing back bias to the input transistor as the blocking transistor is cut off.

5. A stepping switch of the type employing a number of stages that are actuated serially in response to a succession of input pulses comprising:
 (a) a controlled rectifier in each stage,
 (b) a tapped biasing voltage divider in each stage,
 (c) a diode in each stage connected to the tap on the voltage divider in that stage and coupled to the following stage,
 (d) a pulse input bus connected to all of the diodes,
 (e) said voltage dividers being proportioned to back-bias the diodes connected thereto when the stage is not actuated, whereby a signal can be coupled through the diode to the following stage only when the stage containing the diode is in the actuated stage,
 (f) a PNP input transistor coupled to receive trigger signals and further connected to supply pulses to said input bus,
(g) an NPN blocking transistor connected in a common emitter circuit,
(h) a tapped input voltage divider connected between the blocking transistor and ground and having its tap connected to the input transistor, said input voltage divider being proportioned so that the voltage at the tap exceeds the voltage of the trigger signal when the blocking transistor is not conductive, and
(i) a selector switch coupled to the blocking transistor and arranged to connect with the tap on any of the tapped biasing voltage dividers.

6. A stepping switch of the type employing a number of stages that are actuated serially in response to a succession of negative input pulses comprising:
(a) a source of negative voltage,
(b) a controlled rectifier connected in each stage and having an anode and a cathode,
(c) a biasing voltage divider in each stage connected between the anode of the controlled rectifier in that stage and the negative voltage source,
(d) a junction on each of said biasing voltage dividers capacitively coupled to the following stage, each divider being proportioned so that its junction is approximately at ground potential when the stage contaning the divider is not actuated,
(e) a pulse input bus,
(f) a resistor network connected to said bus and proportioned to maintain the bus at a quiescent negative voltage approximately equal to one half the voltage of the negative voltage source,
(g) individual diodes connected between the pulse input bus and the junctions of the biasing voltage dividers, said diodes being oriented to pass current from the bus to the junctions,
(h) a PNP input transistor having a base, a collector, and an emitter and being connected in a grounded emitter circuit,
(i) an input load resistor connected between the pulse input bus and the collector of the input transistor,
(j) an NPN blocking transistor having a base, a collector, and an emitter and being connected in a grounded emitter circuit,
(k) an input voltage divider connected between the collector of the blocking transistor and ground and further having a tap connected to the base of the input transistor, said input voltage divider being proportioned to provide a positive bias greater in magnitude that the input pulse to be employed,
(l) a blocking circuit voltage divider,
(m) a selector switch constructed and arranged to couple any biasing voltage divider junction to the base of the blocking transistor through the blocking circuit voltage divider,
(n) said blocking circuit voltage divider being proportioned so as to cut off the blocking transistor when the switch is connected to an actuated stage.

7. In combination:
(a) a source of positive voltage,
(b) a source of negative voltage,
(c) a plurality of silicon controlled rectifiers arranged for sequential operation, each of said rectifiers having an anode, a gate, and a cathode connected to ground,
(d) individual commutating capacitors connected between adjacent controlled rectifiers,
(e) individual load elements connected between each controlled rectifier anode and the positive voltage source,
(f) individual biasing voltage dividers connected between the anode of each controlled rectifier and the negative voltage source,
(g) an electrical junction approximately midway along each biasing voltage divider,
(h) a coupling capacitors between each electrical junction and the gate of the following controlled rectifier,
(i) a pulse input bus,
(j) first and second equal-valued resistors connecting said bus to ground and to the negative voltage source respectively,
(k) individual diodes connected between each of said electrical junctions and the pulse input bus,
(l) an NPN blocking transistor and a PNP input transistor, each of said transistors having a base, a collector, and an emitter, each of said transistors being connected in grounded emitter circuits, said input transistor further having its collector coupled to said pulse input bus,
(m) a collector resistor connected between the collector of said blocking transistor and the positive voltage source,
(n) a blocking circuit voltage divider connected to said positive voltage source,
(o) selective switching means connected to said blocking circuit voltage divider, said switching means being further arranged to connect with electrical junction of any biasing voltage divider,
(p) a junction on said blocking circuit voltage divider connected to the base of the blocking transistor,
(q) said blocking circuit voltage divider being so proportioned that it maintains the blocking transistor in a conducting state when the selector switch is connected to a biasing circuit voltage divider associated with a non-conducting controlled rectifier,
(r) an input circuit voltage divider connected between the emitter of the input transistor and the collector of the blocking transistor,
(s) a junction on said input circuit voltage divider connected to the base of the input transistor,
(t) said input circuit voltage divider being constructed so that the base of the input transistor is held at a positive potential when the blocking transistor is non-conductive.

8. A stepping switch of the class wherein a first trigger signal actuates a first controlled rectifier and thereby provides an enabling voltage that permits the next trigger pulse to actuate a second controlled rectifier, the combination with said controlled rectifiers of an input circuit coupled to both controlled rectifiers; a blocking device coupled to said input circuit and responsive to an enabling voltage to disable said input circuit; and a selector switch connected to said blocking device and arranged for selectively coupling any enabling voltage to the blocking device.

9. A stepping switch of the class wherein a first trigger signal actuates a first controlled rectifier and thereby provides an enabling voltage that permits the next trigger pulse to actuate a second controlled rectifier, the combination with said controlled rectifiers of an input circuit coupled to both controlled rectifiers; a blocking transistor coupled to said input circuit so as to interrupt the flow of signals through said input circuit when the blocking transistor is in a specified condition, said blocking transistor being arranged to be driven to said specified condition by an enabling voltage; and a selector switch connected to couple an enabling voltage from either controlled rectifier to said blocking transistor.

References Cited by the Examiner
UNITED STATES PATENTS

| 2,722,630 | 11/1955 | Branch et al. | 315—84.5 |
| 2,901,668 | 8/1959 | Thomas | 315—84.5 |

ARTHUR GAUSS, *Primary Examiner.*

J. W. HUCKERT, *Examiner.*

J. ZAZWORSKY, *Assistant Examiner.*